(Model.)
J. M. BOYD.
Horse Hay Fork.
No. 235,065. Patented Dec. 7, 1880.
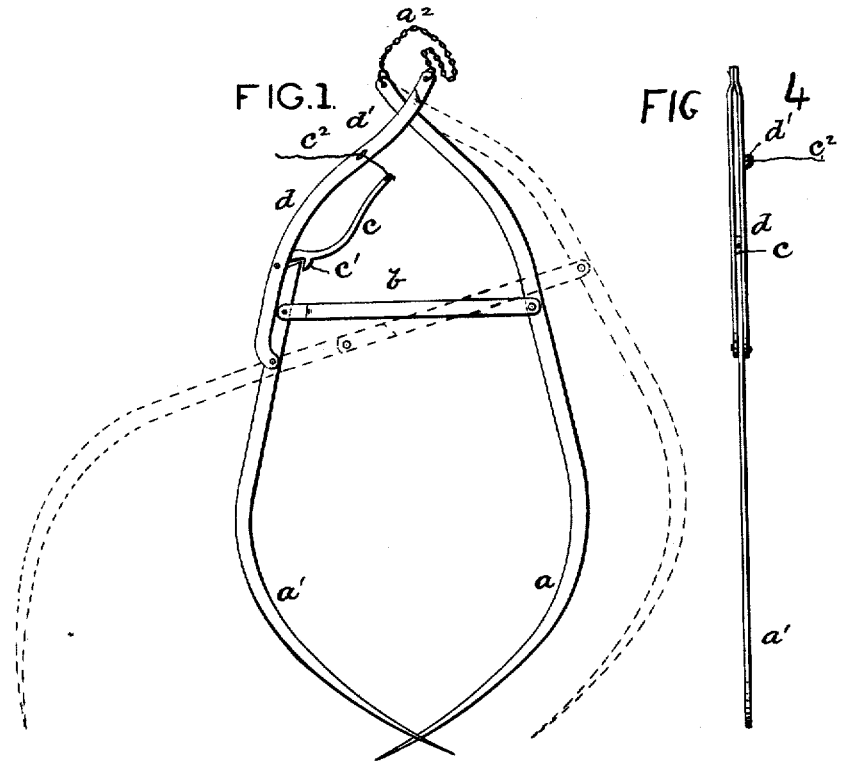
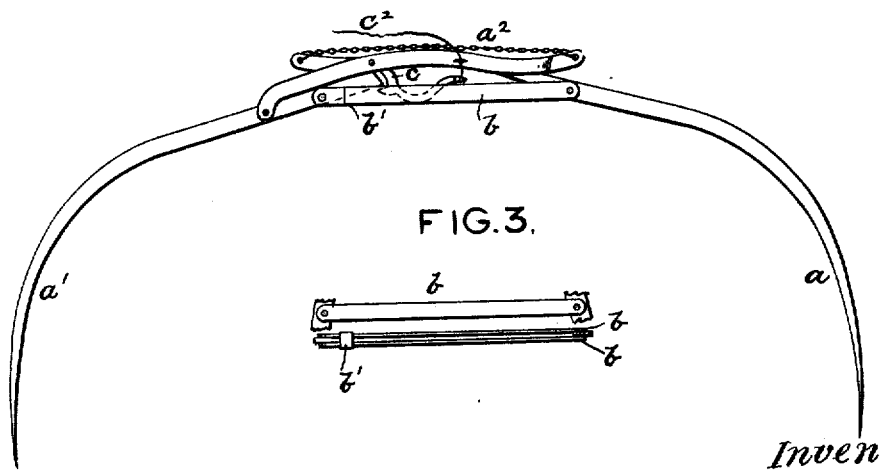
Witnesses:
Wm. H. Lepley,
P. B. Turpin.
Inventor:
John M. Boyd,
By R. S. & A. P. Lacey, Att'ys.

UNITED STATES PATENT OFFICE.

JOHN M. BOYD, OF OAKFIELD, WISCONSIN.

HORSE HAY-FORK.

SPECIFICATION forming part of Letters Patent No. 235,065, dated December 7, 1880.

Application filed September 9, 1880. (Model.)

*To all whom it may concern:*

Be it known that I, JOHN M. BOYD, a citizen of the United States, resident of Oakfield, in the county of Fond du Lac and State of Wisconsin, have invented certain new and useful Improvements in Horse Hay-Forks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to hay-forks having two prongs operating reciprocally; and it consists in the peculiar construction and arrangement of the several parts hereinafter described, and pointed out in the claim.

In the drawings, Figure 1 shows the fork closed. Fig. 2 shows it open. Fig. 3 shows the double cross-bar, and Fig. 4 is an edge view.

$a$ and $a'$ are the prongs of the fork. The prong $a$ is curved, as shown, and has its upper end carried above the cross-bar, hereinafter described, and has attached to it one end of the lifting-chain $a^2$. The prong $a'$ is shorter than the prong $a$.

The two prongs are pivoted between the opposite ends of two cross-bars, $b\ b$, so that they turn freely to close or open, for purposes hereinafter described. There is placed a cross-piece, $b'$, at or near one end of the double bar $b$, which prevents the end of the prong $a'$ from turning down too low.

The upper end of the prong $a'$ extends slightly above the cross-bar, and is formed with a lip or right-angled corner, so that it can be caught readily and held by the tripping-lever $c$, pivoted between the bars composing the supplemental arm $d$.

The arm $d$ is made of two coinciding parallel bars, having their upper ends secured rigidly together, while their lower ends are carried below the pivotal point of the cross-bar $b$ and are fastened on opposite sides of the prong $a'$. The upper end of the prong $a$ passes between the parallel bars of arm $d$, and the latter serves as a guide to uniformity and regularity in the movements of both prongs in opening or closing.

The tripping-lever $c$ is provided with a catch, $c'$, and is so arranged that when the prongs are closed it will engage and lock the prong $a'$ firmly against the side of the lower end of arm $d$.

When the prongs are closed, as shown in Fig. 1, and prong $a'$ is locked by the lever $c$, the device may be opened, as shown in Fig. 2, in proper position to thrust the points down into the hay.

The tripping-lever, when the prongs are open, passes between the two bars of the cross-bar $b$, where it is protected from being interfered with while the points are being thrust into the hay. The tripping-lever is operated by a cord, $c^2$, fixed to its end and running through an eye, $d'$, fixed on the side of the arm $d$.

In the operation of the device, the prongs are opened, as shown in Fig. 2, and are thrust down into the hay. The draft is now applied to the chains $a^2$, which unites the upper ends of prong $a$ and arm $d$, which causes the prongs to close around the bundle of hay and hold the latter while it is being lifted to the top of the stack or other desired place. By drawing the cord $c^2$ the lever $c$ lets go the upper end of prong $a'$, and the two prongs open into the position shown in dotted lines in Fig. 1 and drop the hay. The fork is then drawn back, by means of the trip-rope $c^2$, to the operator, who sets the trip-lever $c$, and, grappling the fork by the prongs just below the cross-bar $b$, opens it, as shown in Fig. 2, and thrusts it into the hay, ready for another load.

This fork may also be constructed with two or more prongs on each side for use in very fine hay or for pitching manure. The prongs would also be shorter for use in manure than for hay.

When made with two or more prongs on a side the upper part of the fork would be the same from the cross-bars up as when made with only one prong on a side, the prongs simply branching out below the cross-bar $b$ into two or more, as desired.

Having thus described my invention, what I claim, and desire to secure by Letters Patent, is—

In a hay-fork, the prong $a$, the prong $a'$, the cross-bar $b$, pivoted to the prong $a$ and to the upper end of the prong $a'$, the supplemental arm $d$, pivoted to the arm $a'$ below the end of the bar $b$, and having its upper end crossed with the upper end of the prong $a$, and provided with a suitable connecting chain or rope, and the tripping-lever $c$, arranged to operate substantially as set forth.

In testimony that I claim the foregoing I have hereunto set my hand and seal this 24th day of August, 1880.

JOHN M. BOYD. [L. S.]

Witnesses:
F. R. SHEPARD,
A. S. BOYD.